(12) United States Patent
Verbo et al.

(10) Patent No.: US 7,082,870 B2
(45) Date of Patent: Aug. 1, 2006

(54) ARRANGEMENT FOR THE BAYONET-FIXING AND LOCKING OF A BRAKE BOOSTER

(75) Inventors: Ulysse Verbo, Sant Cugat (ES); Jean-Charles Maligne, Aubervilliers (FR); Philippe Richard, Chelles (FR)

(73) Assignee: Robert & Bosch GmbH, Stuttgart (DE)

( * ) Notice: Subject to any disclaimer, the term of this patent is extended or adjusted under 35 U.S.C. 154(b) by 0 days.

(21) Appl. No.: 11/013,775

(22) Filed: Dec. 16, 2004

(65) Prior Publication Data

US 2005/0139062 A1    Jun. 30, 2005

(30) Foreign Application Priority Data

Dec. 24, 2003 (FR) .................................. 03 15502

(51) Int. Cl.
*B60T 13/567* (2006.01)
(52) U.S. Cl. .................... 92/161; 92/128; 92/169.4; 91/376 R
(58) Field of Classification Search ............... 92/169.4, 92/161, 128; 91/376 R
See application file for complete search history.

(56) References Cited

U.S. PATENT DOCUMENTS

| 4,725,029 | A | * | 2/1988 | Herve ........................ 92/128 |
| 4,779,515 | A | * | 10/1988 | Staub, Jr. ..................... 92/128 |
| 4,941,764 | A | * | 7/1990 | Breitwieser et al. .......... 92/128 |
| 5,056,412 | A | * | 10/1991 | Gautier et al. ................ 91/368 |
| 6,679,161 | B1 | * | 1/2004 | Vermoesen et al. ....... 91/376 R |

FOREIGN PATENT DOCUMENTS

| DE | 10051339 A1 | * | 10/2001 |
| FR | 2770478 A1 | * | 5/1999 |

* cited by examiner

*Primary Examiner*—Igor Kershteyn
(74) *Attorney, Agent, or Firm*—Leo H McCormick, Jr.; Sarah Taylor

(57) ABSTRACT

An arrangement (10) for the fixing of an axially oriented (A) brake booster (12) on a dashboard (14) of an automobile wherein a rear face (16) of the booster (12) is fixed on a front face (18) of the dashboard (14) through a first bayonet fitting (26) interposed between the rear face (16) of the booster (12) and the front face (18) of the dashboard (14) to prevent the brake booster (12) from rotating.

19 Claims, 10 Drawing Sheets

ARRANGEMENT FOR THE BAYONET-FIXING AND LOCKING OF A BRAKE BOOSTER

The invention relates to an arrangement for the fixing of an axially oriented brake booster on the dashboard of an automobile.

BACKGROUND OF THE INVENTION

The invention relates more particularly to an arrangement for the fixing of an axially oriented brake booster on a dashboard of an automobile, of the type in which a rear face of the booster is designed to be fixed on a front face of the dashboard, and of the type which has first bayonet fitting means interposed between the rear face of the booster and the front face of the dashboard, which comprise:

- a receiving mounting plate having a rear face for fixing to the front face of the dashboard and having a front face carrying at least two hooks, which are spaced angularly around the axial direction along a specified diameter, and having active parts facing towards the axial direction, and
- a fixing plate having a front face for fixing to the rear face of the booster, and having at least two radial wings which extend radially from the fixing plate along the specified diameter, which are spaced angularly around the axial direction, and which are designed, in a position in which the plate is inserted, to be inserted angularly between two consecutive hooks spaced angularly in a similar way to the wings of the plate and which are designed so that, when the fixing plate is pivoted through an angle in a specified direction around the axial position to reach a locking position, each wing is retained axially by the active part of an associated hook to immobilize the fixing plate with respect to the mounting plate in the axial direction,
- elastic means which are interposed between the receiving mounting plate and the fixing plate, which are designed to push the radial wings axially into contact with the active parts of the hooks, and which can be kept compressed in the position in which the fixing plate is introduced and then released by means for keeping them compressed and releasing them.

There are numerous known examples of arrangements for fixing a brake booster.

A first known conventional solution proposes arrangements in which the rear face of the booster has at least two studs which are designed to pass through the dashboard of the vehicle and to be bolted on the side of the dashboard facing the interior of the passenger compartment of the vehicle.

This solution is particularly unfavorable in terms of the speed of assembly in the context of serial production, since it requires entry into the passenger compartment for fixing the booster, an action typically carried out by two operators, one holding the booster while the other screws the bolts from the passenger compartment side.

Moreover, the screwing operation has to be repeated for each stud present on the booster, making this operation particularly inconvenient.

To overcome this drawback, a second known solution proposes the fixing of the booster on the dashboard of the vehicle by the use of bayonet fitting means.

Such fitting means typically comprise male components, such as tabs carried by the booster for example, which are designed, after locking by rotation, to interact with female components such as notches formed in the dashboard of the vehicle. They also comprise first elastic means designed to push the male components into contact with the female components.

Such bayonet fitting means enable the booster to be fitted more easily, by operating on one side of the dashboard only. On the other hand, their installation is still rather inconvenient because the operator responsible for the fitting must compress the elastic means beforehand and then keep them compressed while locking the male components into the female components.

Moreover, these bayonet fitting means may become unlocked unexpectedly when subjected to the vibrations of the vehicle.

SUMMARY OF THE INVENTION

To overcome these drawbacks, the invention proposes an arrangement for fixing a booster of the type described above, in which the fixing does not require the operator to keep the elastic means compressed, and in which fixing can also be carried out by a single operator in a single fitting operation, and can be automated if required. The arrangement according to the invention advantageously comprises means for immobilizing the booster with respect to rotation, to prevent it from becoming unlocked inappropriately.

To this end, the invention proposes an arrangement for the fixing of a booster of the type described above, characterized in that it comprises a removable lock pin which is interposed approximately tangentially between one edge of a hook on the mounting plate and one edge of a radial notch formed on the periphery of the fixing plate to immobilize said fixing plate angularly with respect to rotation about the axial direction in the direction opposite the specified direction.

According to other characteristics of the invention,

- the arrangement comprises means for immobilizing the fixing plate with respect to rotation in the specified direction when it occupies its locking position,
- the receiving mounting plate comprises a base plate, comprising the rear face of the mounting plate, and an approximately cylindrical barrel which extends forward from the base plate, which receives the fixing plate, the end of the barrel comprising the front face carrying the hooks, while its periphery participates in the fixing of the lock pin,
- the lock pin is arranged along the barrel, in an approximately longitudinal direction parallel to the axial direction, and comprises at least a first blade having one end curved towards the notch, a longitudinal edge of this end bearing against the edge of the notch in the fixing plate while its opposite longitudinal edge bears against the edge of the hook when the fixing plate occupies its locked position,
- the lock pin is formed from an elastic material and is approximately in the shape of a "V" consisting of the first blade and a second, shorter blade, the junction end of the two blades being received in an aperture of the base plate, an intermediate part of the first blade and the end of the second blade being received between two facing edges of a U-shaped longitudinal orienting slot facing the hook and carried by a projection which extends approximately radially from the periphery of the barrel, the lock pin having means of immobilization in the longitudinal direction with respect to the projection and/or to the aperture of the base plate, the means of immobilizing the lock pin in the longitudinal direction comprise:
  a fin extending along the first blade between the junction end of the lock pin and the curved end of the first blade, a front edge of which bears against the base plate outside the aperture to immobilize the lock pin in the forward direction, and
  a tab, which projects from the back of the second blade near its end, and which bears on a front face of the projection, to immobilize the lock pin in the backward direction,
the fin has a width approximately equal to that of the blade, to provide a gripping means enabling the blades of the lock pin to be brought together in such a way that it can be extracted to release the fixing plate of the booster,
the elastic means comprise a helical spring which is received in a bore of the barrel which opens on the front face of the fixing mounting plate, and they comprise a bearing cup which has a diameter approximately equal to that of the said bore of the barrel, and which is interposed between the spring and the fixing plate of the booster so that, in the locking position, it pushes the fixing plate of the booster axially in such a way that the wings are pushed into contact with the active parts of the hooks, the means for maintaining compression and for release being designed to keep the helical spring axially compressed or to release it,
the bore of the barrel of the receiving mounting plate comprises a rear section receiving the helical spring and a front section, having a larger diameter than the rear section, opening on the front face of the receiving mounting plate and receiving the bearing cup, these being delimited by a shoulder face,
the means for keeping the elastic means compressed and for releasing them comprise second bayonet fitting means interposed between the cup and the front section of the bore of the barrel of the mounting plate,
the second bayonet fitting means comprise radial lugs of the bearing cup, having radial overall dimensions approximately equal to those of the front section, which, in a position in which the compression is maintained, can be retained axially between the shoulder face and radial tabs of the fixing plate which extend approximately in the plane of its front face to keep the spring compressed and which, in a release position and/or in a fitting position, can escape from said tabs to release the helical spring,
driving means are interposed between the fixing plate and the cup to couple the first and second bayonet fitting means, by associating the booster insertion position with the position in which the elastic means are kept compressed, and by associating the position in which the booster is locked with the position in which the elastic means are released,
the drive means comprise at least two axial projections, spaced angularly in a regular way, which extend forward from the front face of the bearing cup and which are designed to be received in notches formed in the fixing plate, one edge of each of these being designed to push the corresponding projection of the bearing cup to rotate the cup between the booster insertion position associated with the position in which the elastic means are kept compressed and the booster locking position associated with the position in which the elastic means are released,
the arrangement comprises axial stop means designed to retain the bearing cup in the position in which the helical spring is released, to prevent the cup from escaping from the bore of the barrel in case the second bayonet fitting means become inappropriately unlocked,
the bearing cup stop means comprise at least two axial arms, which extend from a rear face of the bearing cup, which surround the helical spring and which are received in the bore of the barrel by means of third bayonet fitting means in such a way as to be movable between a first angular position associated with the fitting of the cup, in which a curved end of each arm is inserted into a longitudinal groove extending backwards in the bore of the barrel from the front face of the receiving mounting plate, and a plurality of angular positions in which the curved end of each arm is received in an aperture passing through the cylindrical wall of the barrel and communicating with the longitudinal groove, these angular positions comprising at least:
  a second angular position associated with the axial resting position of the cup and the position in which the helical spring is kept compressed, in which the rotation of the cup causes the curved end of each arm to be received against a longitudinal edge of the aperture opposite the longitudinal groove,
  a third angular position associated with the axial stop of the cup and with the position in which the helical spring is released, in which, after a rotation of the cup in the opposite direction, the curved end of each arm is brought to bear against a transverse front end face of the aperture, the curved end of each arm 84 traveling along a path of specified length in the aperture, approximately matching the elongation of the helical spring between the position in which it is kept compressed and the position in which it is released,
a longitudinal edge of the aperture, located in the proximity of the longitudinal groove, can form an angular stop for the curved end of each arm of the bearing cup in the third angular position of the cup associated with the locking position of the fixing plate, to form the means for immobilizing the fixing plate with respect to rotation in the specified direction,
the fixing plate comprises at least two fixing bosses, which are spaced angularly in a regular way over a maximum diameter which is less than the minimum diameter along which the active parts of the hooks are spaced, which have a thickness greater than the thickness of the active parts of the hooks, and which are designed to be penetrated by axial means for fixing the booster to the plate, particularly studs enabling the booster to be fixed by nuts on the rear face of the fixing plate,
the fixing plate and the bearing cup both have central holes with diameters equal to or smaller than the internal diameter of the helical spring, to allow the passage of a booster activation rod,
the radial wings of the fixing plate are spaced angularly in an irregular way and/or at least one radial wing, corresponding to the active part of an associated;,hook, extends over an angular sector greater than that of another radial wing to form locating means for positioning the fixing plate on the receiving mounting plate,
the bearing cup comprises at least one axial tab, displaced angularly with respect to the axial projections, which is designed to be received in a corresponding notch formed in the fixing plate, to form locating means for positioning the fixing plate with respect to the bearing cup.

The invention also relates to a method for fitting an axially oriented brake booster on a dashboard of an automobile with the aid of an arrangement of the type described above, characterized in that:
- on the one hand, the booster and fixing plate are assembled together, and on the other hand the spring and bearing cup are fitted in the receiving mounting plate, these steps being carried out independently;
- in a subsequent step, the booster fitted with the fixing plate is offered up to the dashboard, the radial wings of the fixing plate being positioned angularly between the hooks of the receiving mounting plate,
- in a subsequent step, the fixing plate is moved forward to contact the receiving mounting plate,
- and then, in a final step, the booster and the fixing plate are pivoted through the specified angle to lock the fixing plate and release the elastic means.

Other characteristics and advantages of the invention will be made clear by the following detailed description, the comprehension of which will be facilitated by reference to the attached drawings.

DETAILED DESCRIPTION OF THE INVENTION

Figure 1:
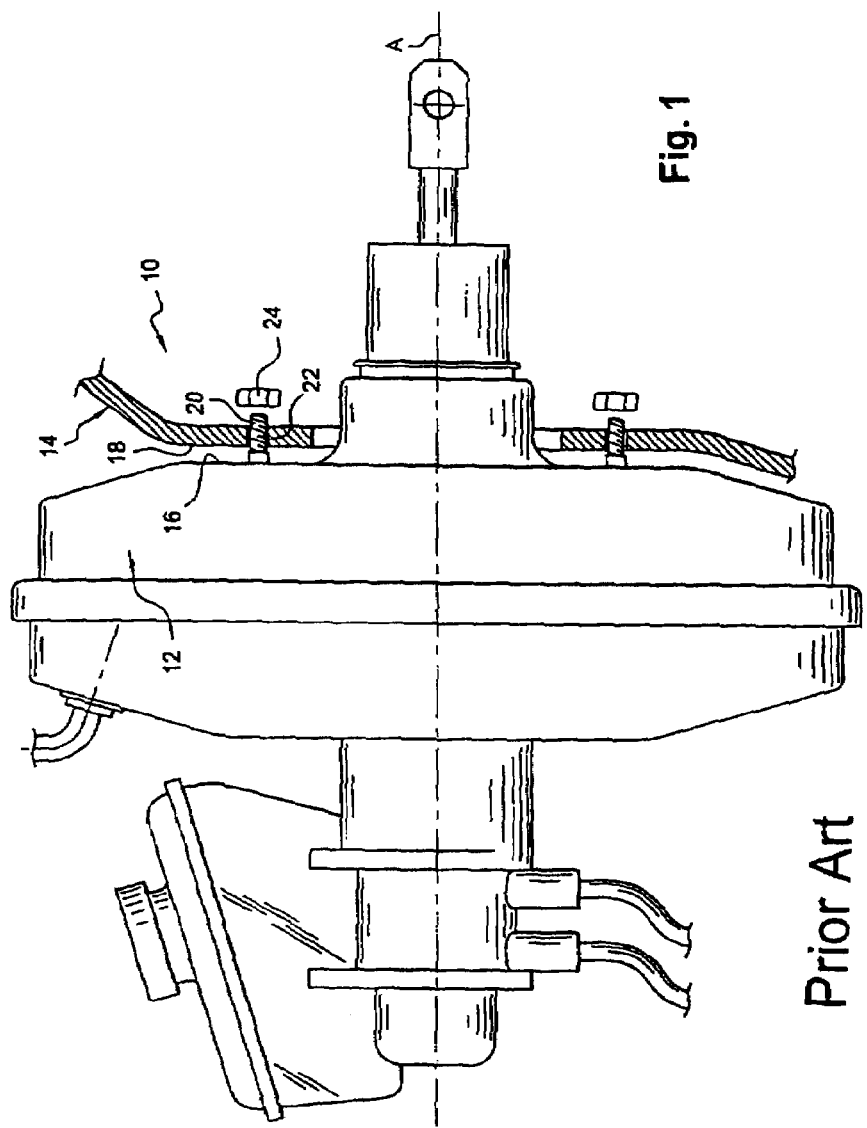
FIG. 1 is a perspective view of a fixing arrangement according to the prior art.

In the following description, identical reference numerals denote parts which are identical or have similar functions.

Conventionally, the terms "front" or "rear" denote, respectively, elements or positions oriented respectively to the left or the right in FIGS. 1 to 10.

FIG. 1 shows the whole of a conventional arrangement 10 for fixing a brake booster 12 oriented along the axis "A" to a dashboard 14 of an automobile.

In an arrangement 10 of this type, a rear face 16 of the booster 12 is designed to be fixed on a front face 18 of the dashboard 14. The booster 12 is fixed in a known way by means of studs 20 which extend from the rear face 16 of the booster 12, which pass through holes 22 in the dashboard 14 and which receive at the back of the dashboard 14, in other words on the passenger compartment side, bolts 24 for fixing the booster 12.

This arrangement is particularly unfavorable in terms of the speed of assembly in the context of serial production, since it requires entry into the passenger compartment for fixing the booster 12, an action typically carried out by two operators, one holding the booster 12 while the other screws the bolts 24 from the passenger compartment side.

To overcome this drawback, it has been: proposed that the booster to be fixed to the dashboard 18 of the vehicle by the use of bayonet fitting means.

The invention proposes, in a known way, bayonet fitting means 26 of this kind. As shown in FIGS. 6 to 9, the arrangement 10 according to the invention also comprises first bayonet fitting means 26 interposed between the rear face 16 of the booster 12 and the front face 18 of the dashboard 14.

In general, the body of the booster 12 can comprise part of the bayonet fitting means which can interact directly with another complementary part of the bayonet fitting means which is carried directly by the dashboard 14.

Such fitting means typically comprise elastic means 46 designed to push on the bayonet assembly to ensure its permanence.

To facilitate the fitting of the booster, as shown in the figures and more particularly in FIGS. 3 to 9, the arrangement according to the invention proposes means for keeping the elastic means 46 compressed and for releasing them.

The bayonet fitting means 26 are interposed separately, in a known way, between the booster 12 and the dashboard 14.

More particular, as shown more particularly in FIGS. 3 to 9, the first bayonet fitting means 26 comprise, in a known way, a receiving mounting plate 28 having a rear face 30 designed to be fixed to the front face 18 of the dashboard 14 and having a front face 32 which carries at least two hooks 34 which are spaced angularly around the axial direction "A". The mounting plate 28 is, for example, fixed to the dashboard of the vehicle by means of screws 33 which pass through holes 27 in the mounting plate 28.

Figure 6:
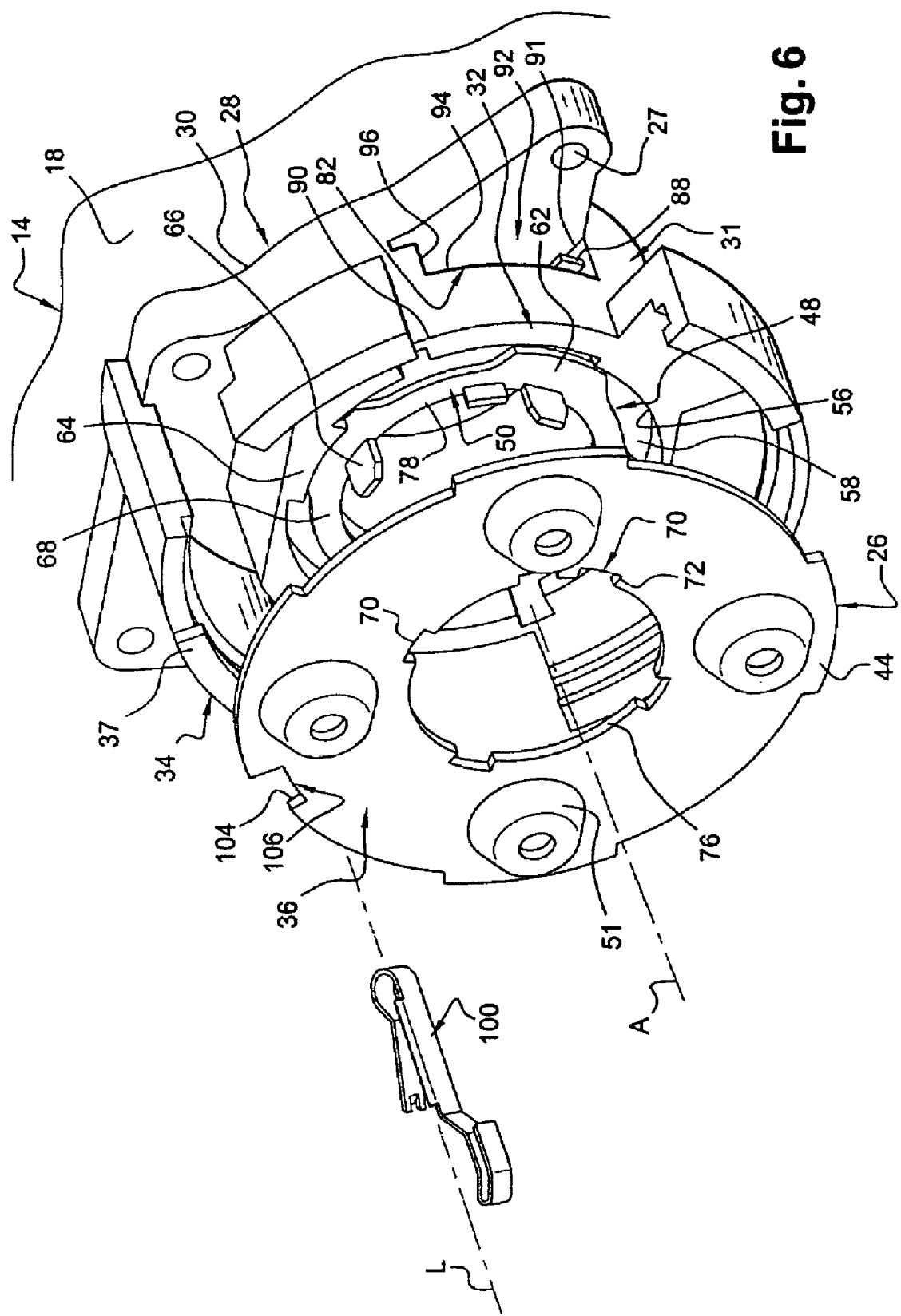
FIG. 6 is a perspective view according to the second embodiment of the invention, showing the fixing plate and the lock pin in a position in which they are offered up to the receiving mounting plate for fitting, with the bearing cup occupying its position in which the elastic means are kept compressed.
Figure 7:
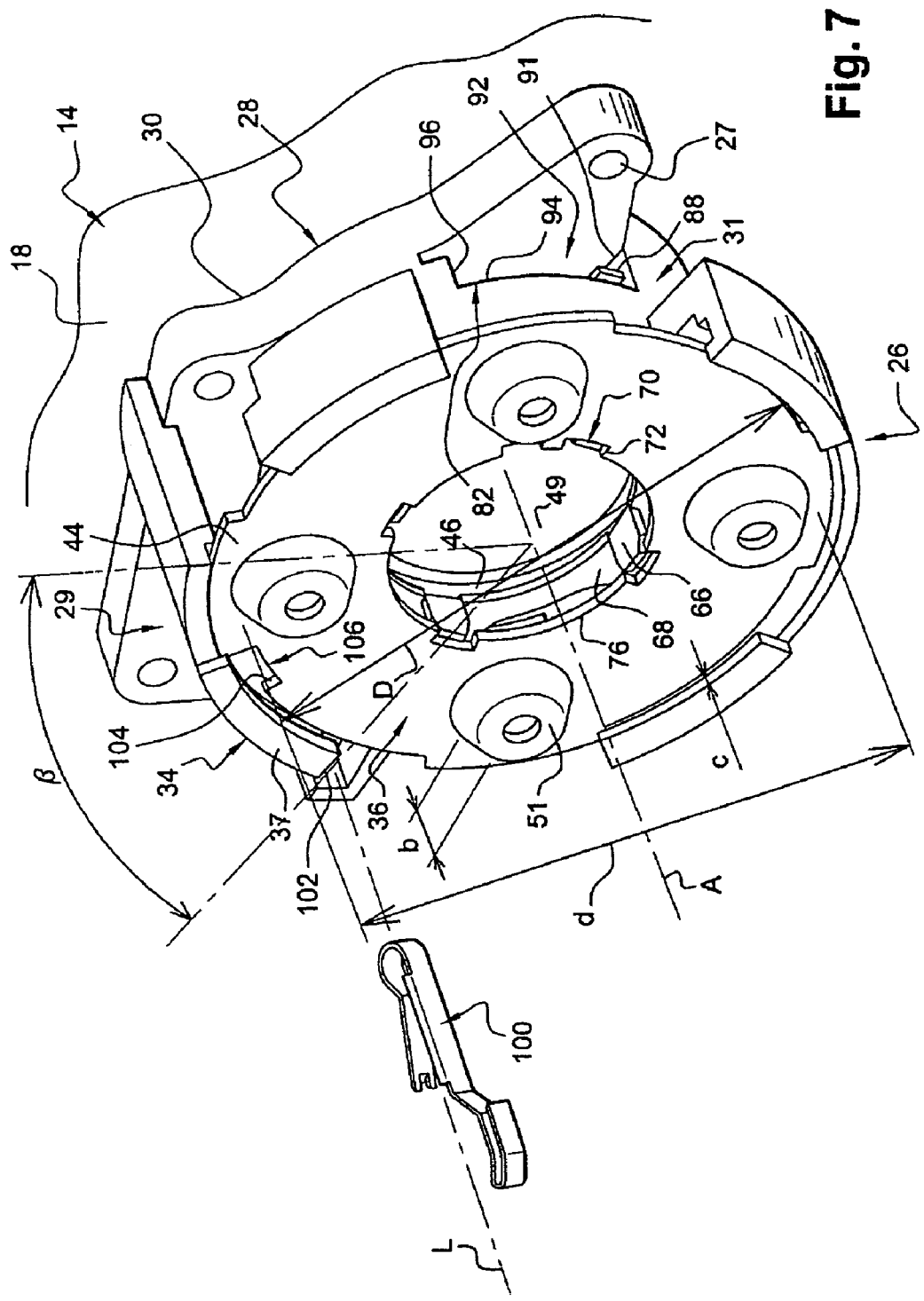
FIG. 7 is a perspective view according to the second embodiment of the invention, showing the fixing plate in a position in which it is inserted into the receiving mounting plate for fitting, with the bearing cup occupying its position in which the elastic means are kept compressed, and the lock pin in the position in which it is offered up for fitting.
Figure 8:
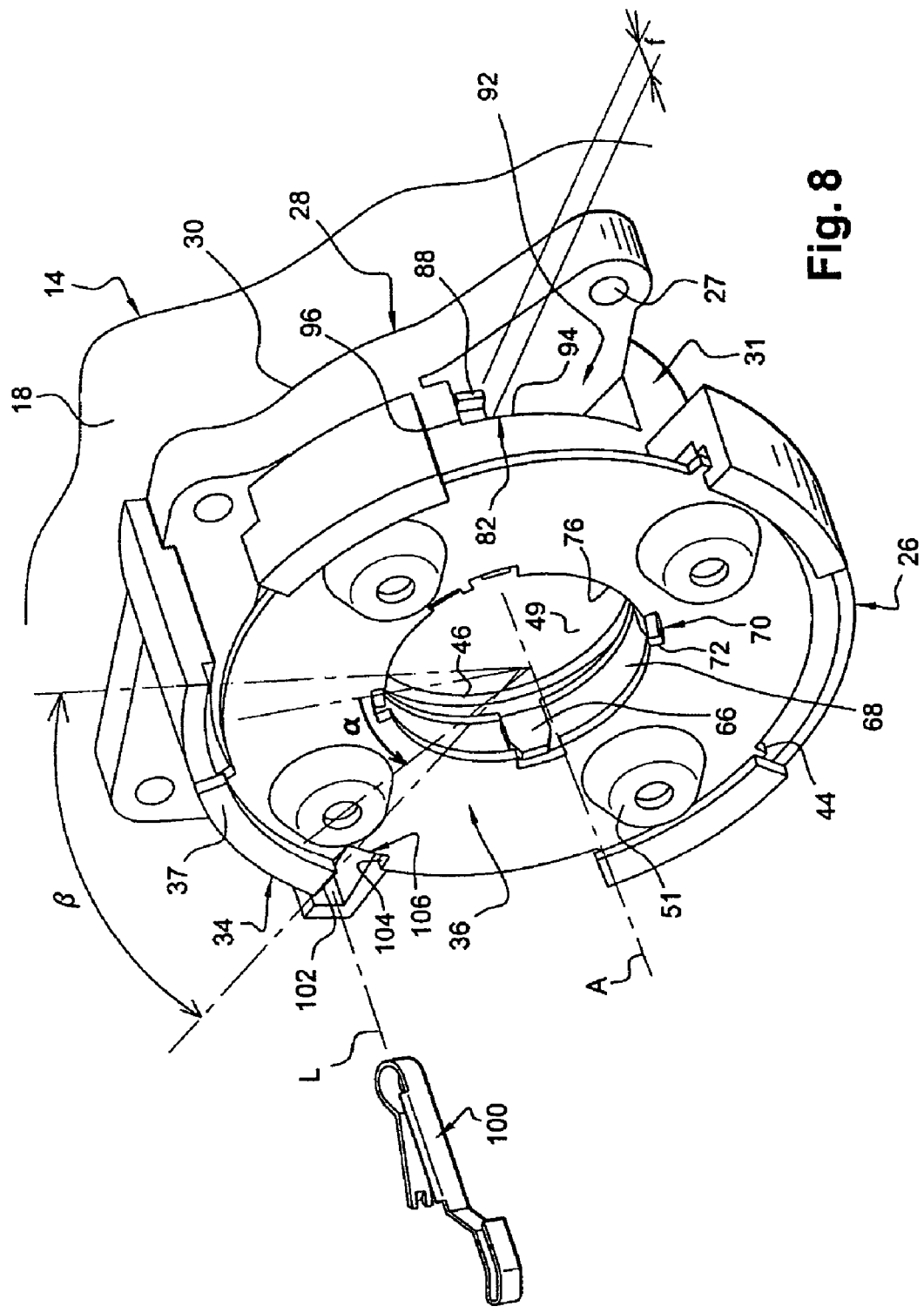
FIG. 8 is a perspective view according to the second embodiment of the invention, showing the fixing plate in the position in which it is locked on the receiving mounting plate, with the bearing cup occupying an intermediate non-locked position in which the elastic means are still compressed.
Figure 9:
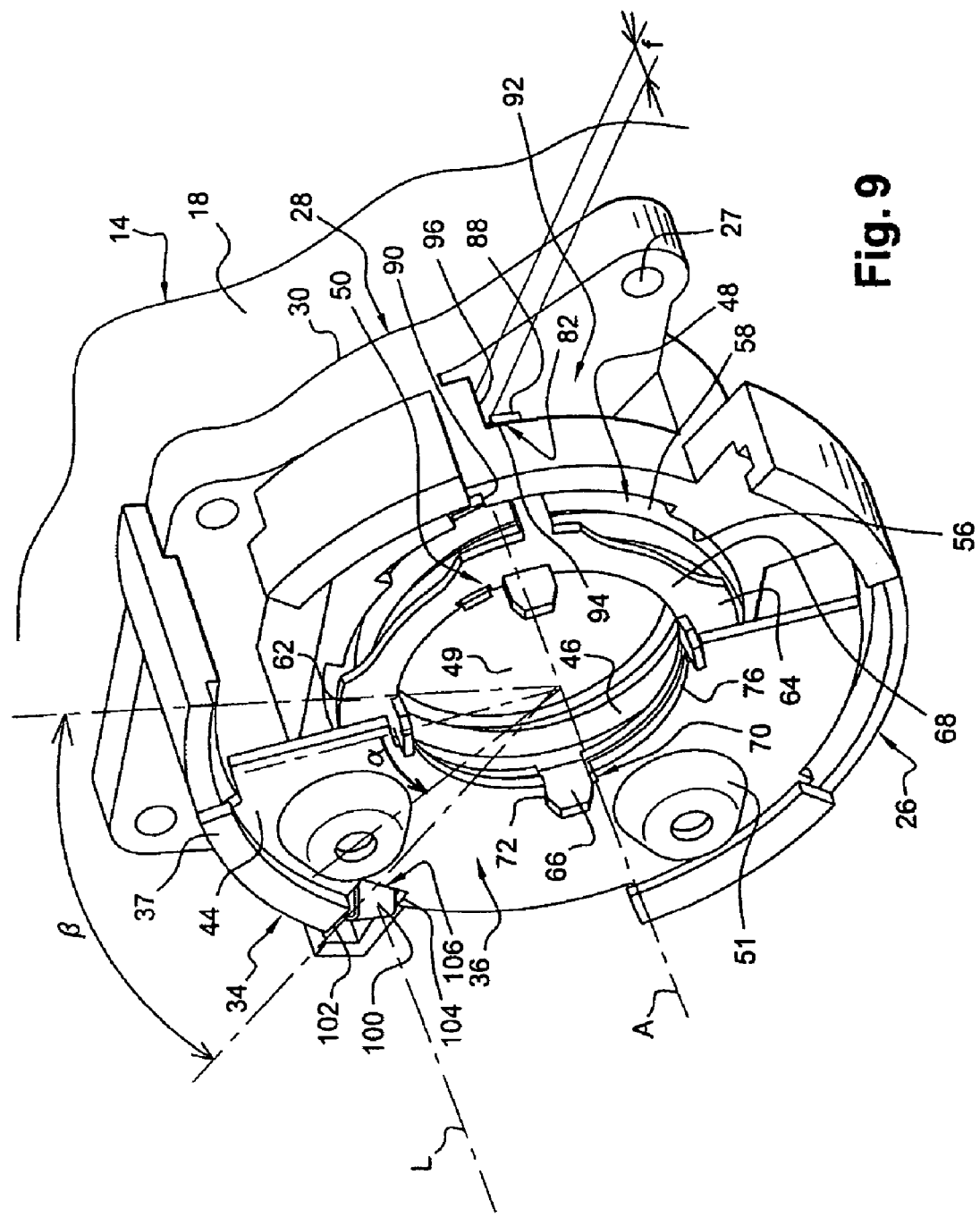
FIG. 9 is a perspective view according to the second embodiment of the invention, showing the fixing plate in its position in which it is locked on the receiving mounting plate, with the bearing cup occupying its position in which the elastic means are released, and with the lock pin immobilizing the fixing plate.

Additionally, as shown more particularly in FIGS. 2 and 6 to 9, the first bayonet fitting means 26 also comprise a fixing plate 36 having a front face 38 which is designed to be fixed to the rear face 16 of the booster 12, and which comprises at least two radial wings 44 for axial immobilization, spaced angularly around the axial direction "A", each of these being designed, in a position of insertion of the plate 36 shown in FIGS. 6 and 7, to be inserted angularly between two consecutive hooks 34 spaced angularly in a similar way to the wings 44 of the plate 36, and also being designed so that, when the fixing plate 36 is pivoted through an angle "α" in a specified direction around the axial position "A" to reach a position in which the booster 12 is locked, as shown in FIGS. 8 and 9, each of them is retained axially by the active part 37 of an associated hook 34 to immobilize the fixing plate 36 with respect to the mounting plate 28 in the axial direction "A". The active parts 37 of the hooks face the axial direction "A", and more particularly the active part 37 of each hook 34 consists of a plate which extends from the orienting body of each hook 34, which is approximately parallel to the axial direction "A", towards the axial direction "A".

In the preferred embodiment of the invention, the plate 36 is approximately circular and the wings 44 and the hooks 34 are spaced along the same periphery.

Figure 2:
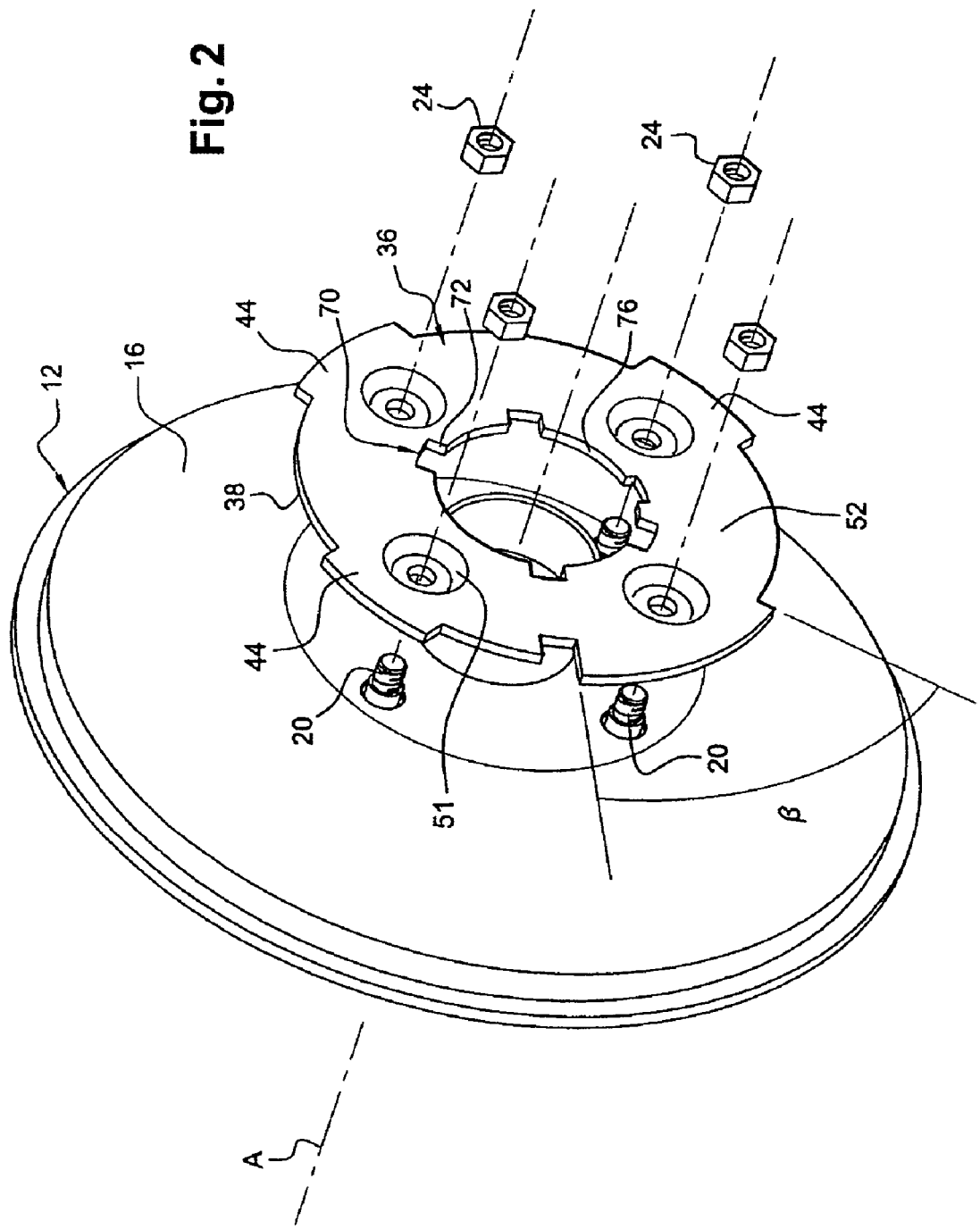
FIG. 2 is an exploded perspective view of a second embodiment of the invention, showing the booster and its fixing plate before their fitting.

In this configuration, as shown in FIGS. 2 and 7, the fixing plate comprises at least two fixing bosses 51, which are spaced angularly in a regular way along a maximum diameter "d" which is smaller than the minimum diameter "D" along which the active parts 37 of the hooks 34 are spaced, which have a thickness "b" greater than the thickness "c" of the active parts 37 of the hooks 34, and which are designed, as shown in FIG. 2, to be penetrated by axial means for fixing the booster 12 to the plate 36, particularly studs 20 enabling the booster to be fixed by nuts 24 on the rear face 52 of the fixing plate 36.

The specified direction of locking of the booster 12 is the anti-clockwise direction as shown in FIGS. 7 and 8, but it is to be understood that this configuration does not limit the invention and that the booster 12 could be locked, by means of a suitable positioning of the hooks 34, by pivoting the booster 12 in the clockwise direction.

In this configuration, as shown in FIGS. 3 to 9, the elastic means 46 are interposed between the receiving mounting plate 28 and the fixing plate 36, and they are designed to push the radial wings 44 axially into contact with the hooks 34 in the locking position. The elastic means 46 can also be kept compressed in the insertion position of the fixing plate 36 and can then be released by the means for maintaining compression and for release, which are described in a later part of the present description.

This configuration makes it unnecessary to keep the elastic means 46 compressed during the insertion of the fixing plate 36 into the receiving mounting plate 28 and subsequently during the rotation of the plate 36 in the anti-clockwise direction.

According to the invention, as shown in FIGS. 6 to 10, the arrangement 10 comprises a removable lock pin 100 which, as shown more particularly in FIG. 9, is interposed approximately tangentially between an edge 102 of a hook 34 and an edge 104 of a notch 106 formed on the periphery of the fixing plate 36 to immobilize said fixing plate 36 angularly with respect to rotation in the clockwise direction opposite to the specified direction for preventing the unlocking of the booster 12.

Additionally, as will be seen subsequently, the arrangement 10 also comprises immobilizing means designed to immobilize the fixing plate 36 with respect to rotation in the specified direction when it occupies its locking position.

Thus, when the fixing plate 36 has been locked in the mounting plate 28, it is immobilized with respect to rotation in the two directions in such a way that it cannot be unlocked.

More particularly, the receiving mounting plate 28 comprises a base plate 29, comprising the rear face of the mounting plate, and an approximately cylindrical barrel 31 which extends forward from the base plate, and which receives the fixing plate 36, the end of the barrel comprising the front face 32 carrying the hooks 34, while its periphery participates in the fixing of the lock pin 100.

Figure 10:
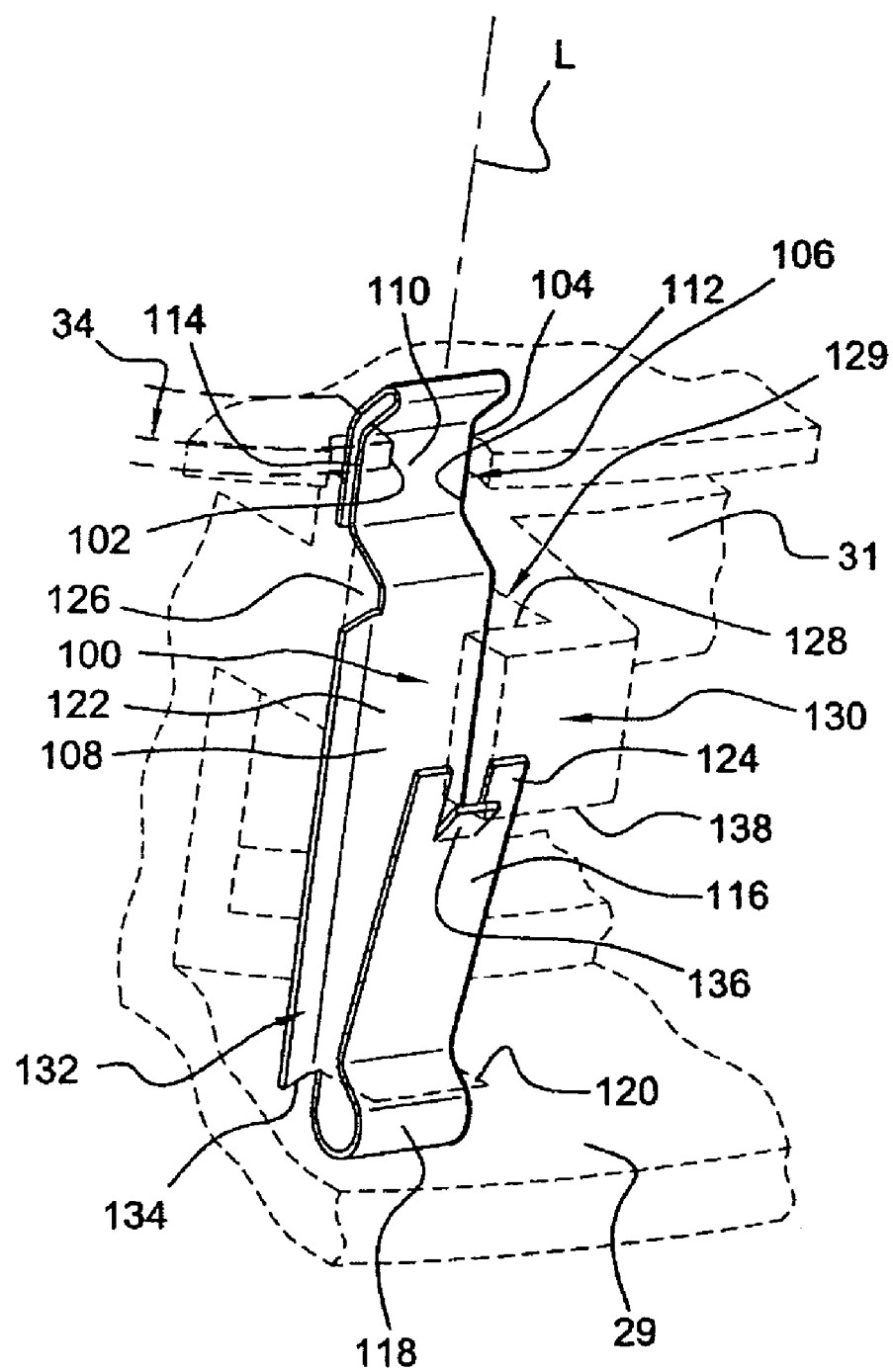
FIG. 10 is a detail view showing the fixing of the lock pin between the fixing disk and the hook of the receiving mounting plate.

As shown in FIGS. 9 and 10, the lock pin 100 is arranged along the barrel 31, approximately in a longitudinal direction "L" parallel to the axial direction. This direction "L" also corresponds, as will be seen subsequently in the remainder of the present description, to the direction of fitting of the lock pin 100, as shown in FIGS. 6 to 9.

As shown in FIG. 10, the lock pin 100 comprises at least a first blade 108 having an end 110 curved toward the notch 106, a longitudinal edge 112 of this end bearing on an edge 104 of the notch 106 of the fixing plate 36 and an opposite longitudinal edge 114 bearing on the edge 102 of the hook 34 when the fixing plate 36 occupies its locked position.

To ensure satisfactory immobilization of the first blade 108, the lock pin 100 is made from an elastic material and is approximately in the form of a "V" consisting of the first blade 108 and a second, shorter blade 116.

A junction end 118 of the two blades 108 and 116 is received in an aperture 120 of the base plate 29. Additionally, in order to immobilize the lock pin 100 against the barrel 31, an intermediate part 122 of the first blade 108 and the end 124 of the second blade 116 are received between two edges 126, 128 facing a U-shaped longitudinal orienting slot 129 facing the hook 34 and carried by a projection 130 which extends approximately radially from the periphery of the barrel 31.

Finally, the lock pin 100 comprises means for immobilizing in the longitudinal direction "L" with respect to the projection 130 and/or to the aperture 120 of the base plate 29.

More particularly, the means for immobilizing the lock pin 100 in the longitudinal direction "L" comprise:

a fin 132 extending along the first blade 108 between the junction end 118 of the lock pin 100 and the curved end 110 of the first blade 108, a front edge 134 of which bears against the base plate 29 outside the aperture 120 to immobilize the lock pin 100 in the forward direction, and a tab 136, which projects from the back of the second blade 116 near its end 124, and which bears on a front face 138 of the projection 130, to immobilize the pin 100 in the backward direction.

Thus, when the lock pin 100 has been inserted between the notch 106 and the rear hook 34 in a forward direction as shown in FIGS. 8 and 9, it is immobilized in the longitudinal direction "L" between the edges 126, 128 of the slot 129 of the projection 130 by the snap fitting of the tab 136 against the front face 138 of the projection 130.

To enable the lock pin 100 to be removed, the fin 132 has a width approximately equal to that of the blade 108. Thus the fin 132 provides a gripping means enabling the blades 108 and 116 of the lock pin 100 to be brought together, which enables the lock pin to be extracted from the slot 129 of the projection 130 and enables the fixing plate 36 of the booster 12 to be unlocked.

In all the embodiments of the invention, as shown in FIGS. 3 to 9, the elastic means 46 comprise a helical spring 46 which is received in a bore 48 of the barrel 31 which opens on the front face 32 of the fixing mounting plate 28.

The spring 46 can, in particular, be centered on a centering bearing 49 which is arranged in the bore 48, but this configuration does not limit the invention.

Clearly, the making of the elastic means 46 in the form of a helical spring does not constitute a limitation of the invention, and the elastic means could comprise any other type of elastic means, particularly a plurality of blade springs interposed, for example, between the front face 32 of the receiving mounting plate 28 and the fixing plate 36.

The elastic means 46 also comprise a bearing cup 50, which has a diameter approximately equal to that of said bore 48 of the barrel 31, and which is interposed between the spring 46 and the fixing plate 36 of the booster 12 to axially push the fixing plate 36 of the booster 12, in the locking position, in such a way as to push the wings 44 into contact with the active parts 37 of the hooks 34, the means for maintaining compression being designed to keep the helical spring 46 axially compressed or to release it.

More particular, the bore 48 of the receiving mounting plate 28 comprises a rear section 54 receiving the helical spring 46 and also comprises a front section 56, which has a greater diameter than the rear section 54, which opens on the front face 32 of the receiving mounting plate 28, and which receives the bearing cup 50. The rear section 54 and front section 56 are delimited by a shoulder face 58.

Figure 5:
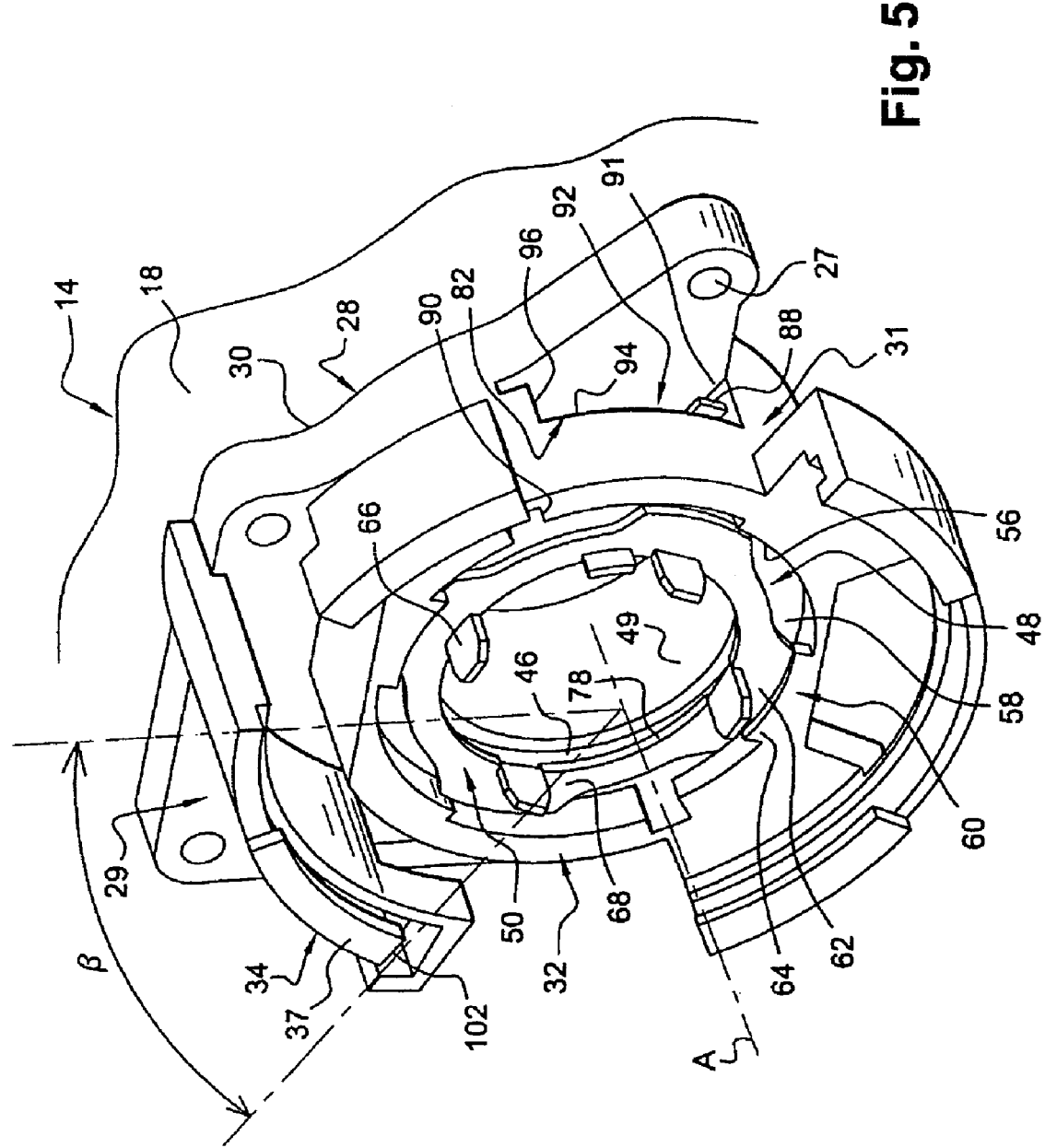
FIG. 5 is an assembled perspective view before fitting according to the second embodiment of the invention, showing the receiving mounting plate, the helical spring and the bearing cup, the bearing cup occupying its position in which the elastic means are kept compressed.

In this configuration, the means for keeping the elastic means 46 compressed and for releasing them comprise second bayonet fitting means 60, shown for example in, FIG. 5, which are interposed between the cup 50 and the front section 56 of the bore 48 of the mounting plate 28.

Figure 3:
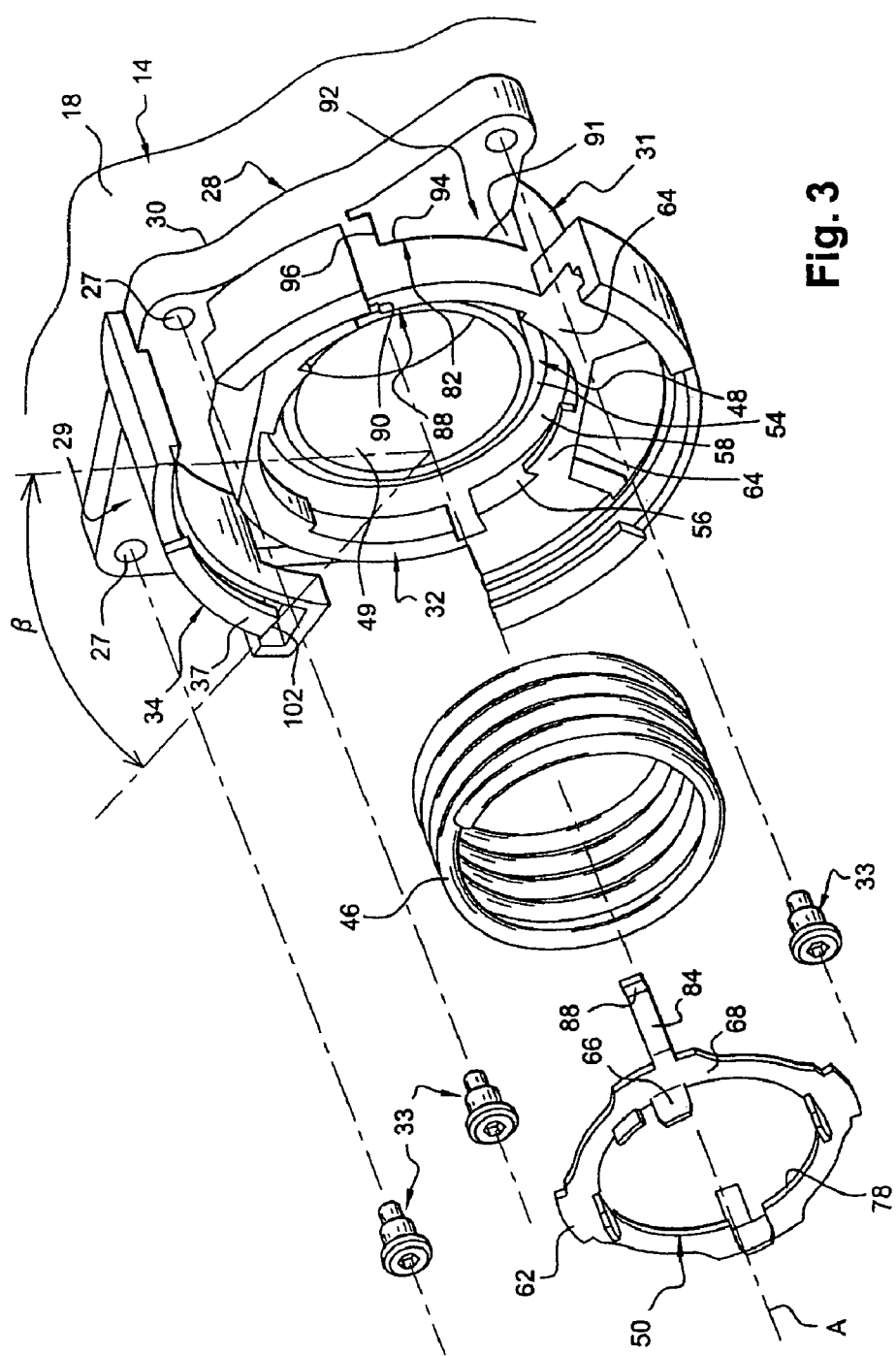
FIG. 3 is an exploded perspective view of the second embodiment of the invention, showing the receiving mounting plate, the helical spring and the bearing cup before their fitting.
Figure 4:
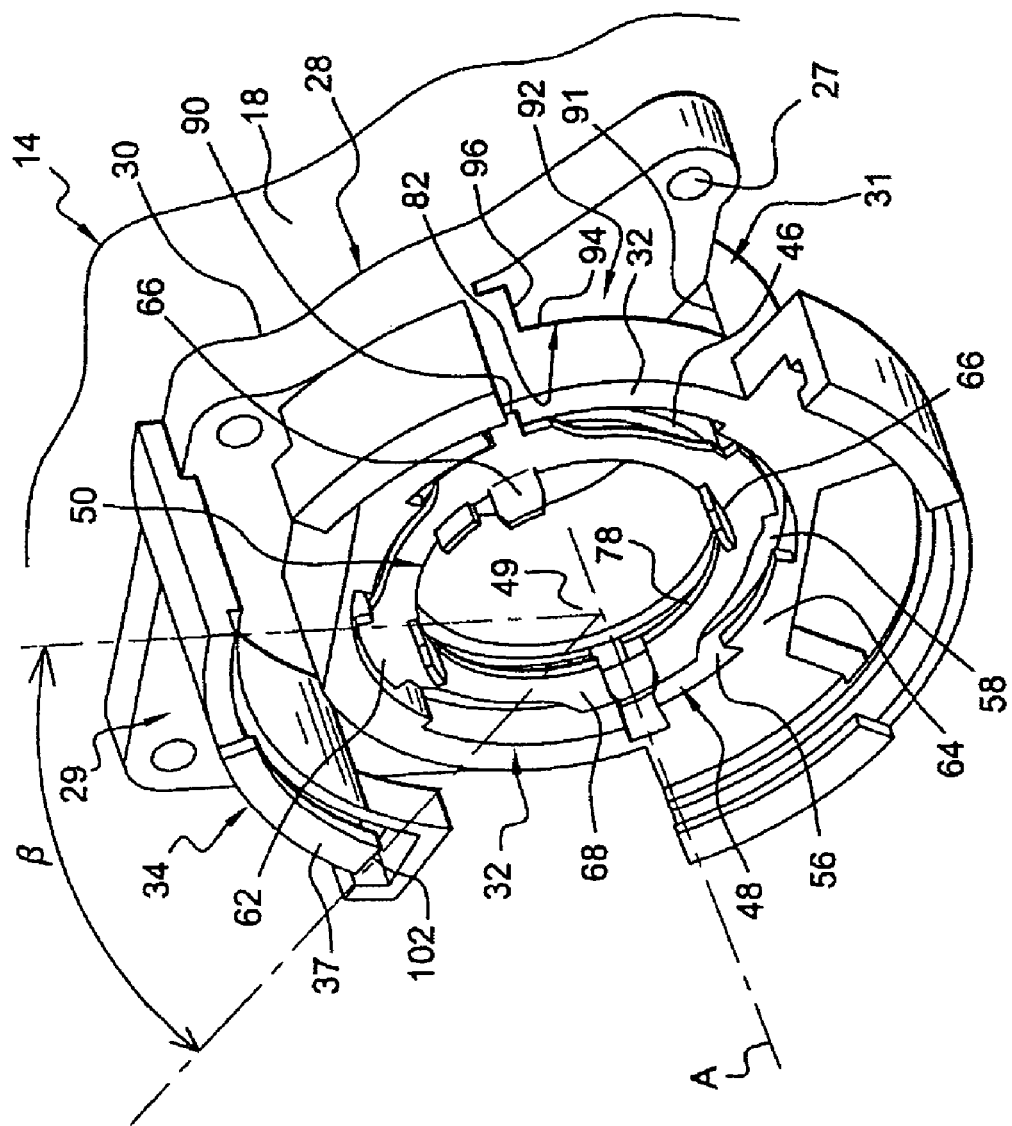
FIG. 4 is an assembled perspective view before fitting according to the second embodiment of the invention, showing the receiving mounting plate, the helical spring and the bearing cup, the bearing cup occupying an intermediate non-locked position in which the elastic means are compressed.

More particularly, as shown in FIGS. 3 to 5, the second bayonet fitting means 60 comprise radial lugs 62 of the bearing cup 50, having radial overall dimensions approximately equal to those of the front section 56, which, in a position of maintaining the compression, can be retained axially between the shoulder face 58 and radial tabs 64 of the mounting plate 28 which extend approximately in the plane of its front face 32 to keep the spring 46 compressed and which, in a release position, can escape from said tabs 64 to release the helical spring 46.

Advantageously, these second bayonet fitting means 60 are controlled by the first bayonet fitting means 26, in such a way that the booster 12 can be fitted in a single operation carried out by a single operator.

To this end, drive means are interposed between the fixing plate 36 and the cup 50 to couple the first bayonet fitting means 26 and the second bayonet fitting means 60, by associating the insertion position of the booster 12 with the position in which the elastic means 46 are kept compressed, as shown in FIGS. 5 to 7, and by associating the locking position of the booster 12 or a fitting position of the elastic means with the release position of the elastic means 46, as shown in FIGS. 8 and 9.

More particularly, as shown in FIGS. 4 to 9, the drive means comprise at least two axial projections 66, spaced angularly in a regular way, which extend forward from the front face 68 of the bearing cup 50 and which are designed to be received in notches 70 formed in the fixing plate 36 as shown in FIGS. 7 to 9. One edge 72 of each notch 70 is designed to push the corresponding projection 66 of the bearing cup 50 to rotate the cup 50 between the position of insertion of the booster 12 associated with the position in which the spring 46 is kept compressed and the locking position of the booster 12 associated with the position in which the spring 46 is released.

The arrangement also advantageously comprises axial stop means 82 designed to retain the bearing cup 50 in the position in which the helical spring 46 is released, to prevent the cup 50 from escaping from the bore 48 of the barrel 31 in case the second bayonet fitting means 60 become inappropriately unlocked.

More particularly, these stop means 82 of the bearing cup 50 comprise at least two axial arms 84, which extend from a rear face 86 of the bearing cup 50, which surround the helical spring 46 and which are received in the bore 48 of the barrel 31 by the use of third bayonet fitting means in such a way as to be movable between:

an angular position for the fitting of the cup 50, shown in FIG. 4, in which a curved end 88 of each arm 84 is inserted into a longitudinal groove 90 which extends backward into the bore 48 of the barrel from the front face 32 of the receiving mounting plate 28, a plurality of angular positions in which the curved end 88 of each arm 84 is received in an aperture 92 passing through the cylindrical wall of the barrel 31 and communicating with the longitudinal groove 90, these angular positions comprising, at least, a second angular position associated with the axial resting position of the cup 50 and the position in which the helical spring 46 is kept compressed, in which the rotation of the cup 50 causes the curved end 88 of each arm 84 to be received against a longitudinal edge 91 of the aperture 92 opposite the longitudinal groove 90; and a third angular position associated with the axial stop of the cup 50 and with the release position of the helical spring 46, in which, after a rotation of the cup 50 in the opposite direction, the curved end 88 of each arm 84 is brought to bear against a transverse front end face 94 of the aperture 92, the curved end 88 of each arm 84 traveling along a path of specified length "f" in the aperture, approximately matching the elongation of the helical spring 46 between the position in which it is kept compressed and the position in which it is released, as shown in FIGS. 8 and 9.

Clearly, the longitudinal dimension of the aperture 92 is at least equal to the length of the path "f" of the ends 88 of the arms 84 during the release of the spring 46.

Thus the ends 88 of the arms 84 of the cup 50 enable the compressed spring 46 to be partially retained in case of incorrect manipulation before the final fitting of the booster 12.

Advantageously, a longitudinal edge 96 of the aperture 92, located in the proximity of the longitudinal groove 90, can form an angular stop for the curved end 84 of each arm of the bearing cup 50 in the third angular position of the cup 50 associated with the locking position of the fixing plate 36, to form the means for immobilizing the fixing plate 36 with respect to rotation in the specified direction.

In this way, the booster 12 is immobilized with respect to rotation in one direction by the lock pin 100 and in the other direction by the stop end 96 of the aperture 92, thus preventing it from being unlocked unexpectedly.

Finally, it will be noted that, as shown in FIGS. 2 and 7 in particular, each of the fixing plate 36 and the bearing cup 50 has a central hole 76, 78 having a diameter equal to or smaller than the internal diameter of the helical spring 46, to permit the passage of a tail rod of the booster which receives an activating rod of the booster 12, particularly in the form of a sliding fitting.

Another advantage of the invention is that the arrangement 10 has locating means for fitting the fixing plate 36 and for fitting the cup 50.

As shown in FIGS. 2 to 9, the radial wings 44 of the fixing plate 36 are spaced angularly in an irregular way and/or at least one radial wing 44, corresponding to the active part of an associated hook 34, extends over an angular sector "β" greater than that of another radial wing 44 to form locating means for positioning the fixing plate 36 on the receiving mounting plate 28. Thus the fixing plate 36 can be fitted in one way only on the receiving mounting plate 28.

In the preferred embodiment of the invention, but without limiting the invention, it will be noted that the wing 44 in the form of an angular sector "β" is adjacent to the notch 106 to facilitate its identification during fitting.

In this configuration, the booster 12 can be fitted by a fitting method shown in FIGS. 2 to 9.

On the one hand, the booster 12 and fixing plate 36 are assembled together as shown in FIG. 2, and on the other hand the spring 46 and bearing cup 50 are fitted in the receiving mounting plate 28 as shown in FIGS. 3 to 5, these steps being carried out independently.

Then, in a subsequent step, the booster 12 fitted with the fixing plate 36 is offered up to the receiving mounting plate 28, as shown in FIG. 6, the wings 44 being positioned angularly within the hooks 34.

Then, in a subsequent step, the fixing plate 36 is moved forward to contact the receiving mounting plate 28, as shown in FIG. 7.

Lastly, in a final step, the booster 12 and the fixing plate 36 are pivoted through the specified angle "α" to lock the fixing plate 36 as shown in FIG. 8.

The spring 46 is released, and the lock pin 100 is then inserted, as shown in FIG. 9.

The invention therefore proposes an arrangement which can considerably simplify the operations of fixing a booster 12 and can consequently reduce the assembly costs of a vehicle having a booster of this type. This arrangement can also considerably simplify the operations of replacing a booster of this type in case of failure. Finally, in addition to the simplicity of fitting of the booster 12, such an arrangement 10 makes it possible to fit the booster 12 without carrying out any operations from the passenger compartment of the vehicle.

What is claimed is:

1. An arrangement (10) for attachment of an axially oriented (A) brake booster (12) on a dashboard (14) of an automobile wherein a rear face (16) of the booster (12) is fixed on a front face (18) of the dashboard (14), and wherein a first bayonet fitting means (26) is interposed between the rear face (16) of the booster (12) and the front face (18) of the dashboard (14), which comprise:

a receiving mounting plate (28) having a rear face (30) designed to be fixed to the front face (18) of the dashboard (14) and having a front face (32) carrying at least two hooks (34), which are spaced angularly around the axial direction (A) along a specified diameter (D), and having its active parts (37) facing towards the axial direction (A), and a fixing plate (36) having a front face (38) designed to be fixed to the rear face (16) of the booster (12), and having at least two radial wings (44) which extend radially from the fixing plate (36) along the specified diameter (D), which are spaced angularly around the axial direction (A), and which are designed, in a position of insertion of the plate (36), to be inserted angularly between two consecutive hooks (34) spaced angularly in a similar way to the wings (44) of the plate (36) and which are designed so that, when the fixing plate (36) is pivoted through an angle (α) in a specified direction around the axial position (A) to reach a locking position, each wing is retained axially by the active part (37) of an associated hook (34) to immobilize the fixing plate (36) with respect to the mounting plate (28) in the axial direction (A), elastic means (46), which are interposed between the receiving mounting plate (28) and the fixing plate (36), which are designed to push the radial wings (44) axially into contact with the active parts of hooks, and which can be kept compressed in the position in which the fixing plate (36) is inserted and then released by means for keeping them compressed and releasing them, and further characterized by a removable lock pin, that is interposed approximately tangentially between an edge (102) of a hook (34) of the mounting plate and an edge (104) of a radial notch (106) formed on the periphery of the fixing plate (36) to immobilize said fixing plate (36) angularly with respect to rotation around the axial direction (A) in the direction opposite to the specified direction to prevent the unlocking of the booster (12).

2. The arrangement (10) as claimed in claim 1, further characterized by means (88, 96) for immobilizing the fixing plate (36) with respect to rotation in a specified direction when it occupies its locking position.

3. The arrangement (10) as claimed in claim 2 further characterized by said mounting plate (28) having a base plate (29) with a rear face (30) and an approximately cylindrical barrel (31) which extends forward from the base plate (29) that receives said fixing plate (36) and wherein an end of the barrel (31) has a front face (32) carrying the hooks (34) and a periphery surface participates in the fixing of the lock pin (100).

4. The arrangement (10) as claimed in claim 3, wherein said lock pin (100) is arranged along the barrel (31) and is located in an approximately longitudinal direction (L) parallel to the axial direction (A), said lock pin (100) having a first blade (108) with an end (110) that curved towards the notch and a longitudinal edge (112) of said end (110) that bears against the edge (104) of the notch (106) in the fixing plate (36) while an opposite longitudinal edge (114) bears against the edge (102) of the hook (34) when the fixing plate (36) occupies its locked position.

5. The arrangement (10) as claimed in claim 4 wherein said lock pin is formed from an elastic material and is approximately in a V shape consisting of the first blade and a second, shorter blade, the junction end of the two blades being received in an aperture of the base plate, an intermediate part of the first blade and the end of the second blade being received between two facing edges of a U-shaped longitudinal orienting slot facing the hook and carried by a projection which extends approximately radially from the periphery of the barrel, the lock pin having means of immobilization in the longitudinal direction with respect to the projection and/or to the aperture of the base plate.

6. The arrangement (10) as claimed in claim 5 further characterized by means for immobilizing the lock pin in the longitudinal direction comprise:

a fin extending along the first blade between the junction end of the pin and the curved end of the first blade, a front edge of which bears against the base plate outside the aperture to immobilize the pin in the forward direction, and a tab, which projects from the back of the second blade near its end, and which bears on a front face of the projection, to immobilize the pin in the backward direction.

7. The arrangement (10) as claimed in claim 6, wherein said fin has a width approximately equal to that of the blade, to provide a gripping means enabling the blades of the lock pin to be brought together in such a way that it can be extracted to release the fixing plate of the brake booster.

8. The arrangement (10) as claimed in claim 7, further characterized wherein said elastic means (46) comprise a helical spring (46) which is received in a bore (48) of the barrel which opens on the front face (32) of the fixing mounting plate (28), and in that they comprise a bearing cup (50) which has a diameter approximately equal to that of the said bore (48) of the barrel, and which is interposed between the spring (46) and the fixing plate (36) of the booster (12) so that, in the locking position, it pushes the fixing plate (36) of the booster (12) axially in such a way that the wings (44) are pushed into contact with the active parts of the hooks (34), the means for keeping compression and for release being designed to keep the helical spring (46) axially compressed or to release it.

9. The arrangement (10) as claimed in claim 8, further characterized in that:
the bore (48) of the barrel of the receiving mounting plate (28) comprises a rear section (54) receiving the helical spring (46) and a front section (56), having a larger diameter than the rear section (54), opening on the front face (32) of the receiving mounting plate (28) and receiving the bearing cup (50), these being delimited by a shoulder face (58); and
the means for keeping the elastic means (46) compressed and for releasing them comprise second bayonet fitting means (60) interposed between the cup (50) and the front section (56) of the bore (48) of the barrel of the mounting plate (12).

10. The arrangement (10) as claimed claim 9, wherein said second bayonet fitting means (60) comprise radial lugs (62) of the bearing cup (50), having radial overall dimensions approximately equal to those of the front section (56), which, in a position of maintaining the compression, can be retained axially between the shoulder face (58) and radial tabs (64) of the fixing mounting plate (28) which extend approximately in the plane of its front face (32) to keep the spring compressed and which, in a release position and/or in a fitting position, can escape from said tabs (64) to release the helical spring (46).

11. The arrangement (10) as claimed in claim 10 further characterized by driving means that are interposed between the fixing plate (36) and the cup (50) to couple the first and second bayonet fitting means (26, 60), by associating the position in which the booster (12) is inserted with the position in which the elastic means (46) are kept compressed, and by associating the locking position of the booster (12) with the position of release of the elastic means.

12. The arrangement (10) as claimed in claim 11 wherein said driving means comprise at least two axial projections (66), spaced angularly in a regular way, which extend forward from the front face (68) of the bearing cup (50) and which are designed to be received in notches (70) formed in the fixing plate (36), one edge (72) of each of these being designed to push the corresponding projection (66) of the bearing cup (50) to rotate the cup (50) between the position of insertion of the booster (12) associated with the position in which the elastic means (46) are kept compressed and the locking position of the booster (12) associated with the position in which the elastic means (46) are released.

13. The arrangement (10) as claimed in claim 12 further providing an axial stop means designed to retain the bearing cup in the position in which the helical spring is released, to prevent the cup from escaping from the bore of the barrel in case the second bayonet fitting means (60) become inappropriately unlocked.

14. The arrangement (10) as claimed in claim 13 wherein said stop means of the bearing cup comprise at least two axial arms, which extend from a rear face of the bearing cup, which surround the helical spring and which are received in the bore of the barrel by the use of third bayonet fitting means in such a way as to be movable between:
a first angular position associated with the fitting of the cup, in which a curved end of each arm is inserted into a longitudinal groove which extends backward into the bore of the barrel from the front face of the receiving mounting plate; and
a plurality of angular positions in which the curved end of each arm is received in an aperture passing through the cylindrical wall of the barrel and communicating with the longitudinal groove, these angular positions comprising, at least:
a second angular position associated with the axial resting position of the cup and the position in which the helical spring is kept compressed, in which the rotation of the cup causes the curved end of each arm to be received against a longitudinal edge of the aperture opposite the longitudinal groove; and
a third angular position associated with the axial stop of the cup and with the release position of the helical spring, in which, after a rotation of the cup in the opposite direction, the curved end of each arm is brought to bear against a transverse front end face of the aperture, the curved end of each arm 84 traveling along a path of specified length in the aperture, approximately matching the elongation of the helical spring between the position in which it is kept compressed and the position in which it is released.

15. The arrangement as claimed in claim 14, wherein a longitudinal edge of the aperture, located in the proximity of the longitudinal groove forms an angular stop for the curved end of each arm of the bearing cup and in the third angular position of the cup associated with the locking position of the fixing plate forms the means for immobilizing the fixing plate with respect to rotation in the specified direction.

16. The arrangement (10) as claimed in claim 1 wherein said fixing plate (36) comprises at least two fixing bosses (51), which are spaced angularly in a regular way along a maximum diameter (d) which is smaller than the minimum diameter (D) along which the active parts (37) of the hooks (34) are spaced, which have a thickness (b) greater than the thickness (c) of the active parts (37) of the hooks (34), and which are designed to be penetrated by axial means for fixing the booster (12) to the plate (36), particularly studs (20) enabling the booster to be fixed by nuts (24) on the rear face (52) of the fixing plate (36).

17. The arrangement (10) as claimed in claims 8 wherein said fixing plate (36) and the bearing cup (50) each have a central hole (76, 78) with a diameter equal to or smaller than the internal diameter of the helical spring (46), to allow the passage of an activating rod for the booster (12).

18. The arrangement (10) as claimed in claim 1 wherein each radial wings (44) of the fixing plate (36) are spaced angularly in an irregular way and/or in that at least one radial wing, corresponding to the active part of an associated hook, extends over an angular sector greater than that of another radial wing to form locating means for positioning the fixing plate on the receiving mounting plate.

19. The arrangement (10) as recited in claim 8 wherein the booster (12) and the fixing plate (36) are assembled together, and the spring (46) and the bearing cup (50) are fitted in the receiving mounting plate (28) in the following steps being carried out independently,
   a) the booster (12) fitted with the fixing plate (36) is offered up to the receiving mounting plate (28), the radial wings of the fixing plate being positioned angularly between the hooks of the receiving mounting plate,
   b) the fixing plate is moved forward to contact the receiving mounting plate,
   c) the booster (12) and the fixing plate (36) are pivoted through the specified angle (α) to lock the fixing plate (36) and release the elastic means (46).

* * * * *